(No Model)
W. A. FEURTADO.
PROTECTIVE GUARD FOR SHIPS.
No. 584,545. Patented June 15, 1897.
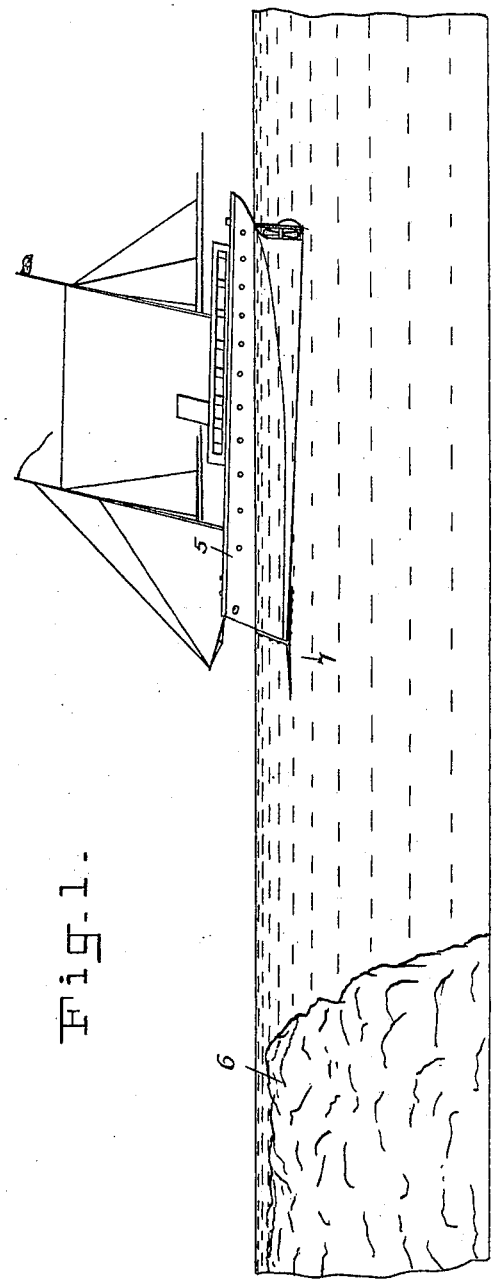
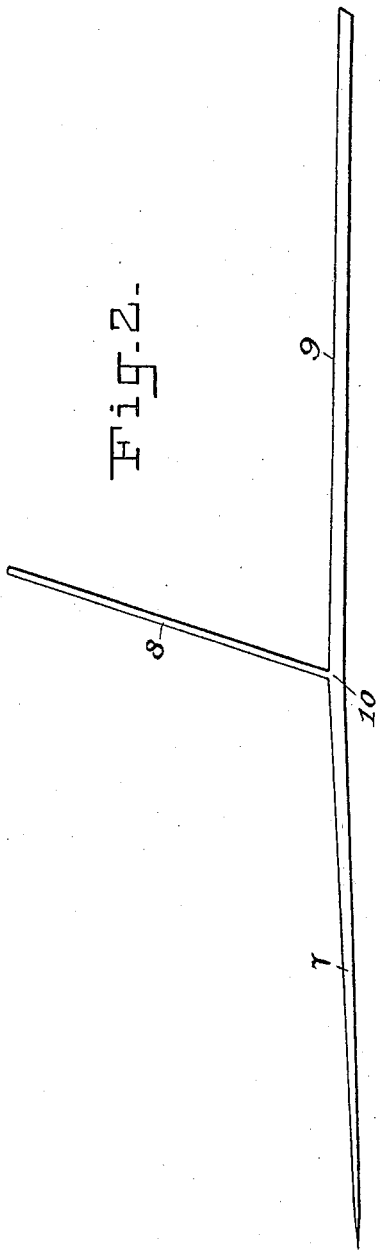
WITNESSES:
E. B. Bolton
E. A. Scott
INVENTOR
Walter Augustus Feurtado
by Richard &c.
ATTORNEYS
THE NORRIS PETERS CO., PHOTO-LITHO., WASHINGTON, D. C.

UNITED STATES PATENT OFFICE.

WALTER AUGUSTUS FEURTADO, OF KINGSTON, JAMAICA.

PROTECTIVE GUARD FOR SHIPS.

SPECIFICATION forming part of Letters Patent No. 584,545, dated June 15, 1897.

Application filed September 10, 1896. Serial No. 605,428. (No model.)

*To all whom it may concern:*

Be it known that I, WALTER AUGUSTUS FEURTADO, a subject of the Queen of Great Britain and Ireland, and residing at Cottage Grove, in the parish of Kingston, in the Island of Jamaica, have invented a certain new and useful Improvement for the Protection of Ships, of which the following is a specification, such as will enable those skilled in the art to which it pertains to make and use the same, reference being had to the accompanying drawings, forming part thereof, in which similar letters of reference designate like or equivalent parts wherever found throughout the several views.

The invention is fully disclosed in the following specification, of which the accompanying drawings form a part.

Figure 1 is a side view of a vessel provided with my improvement and showing a reef, and Fig. 2 is a side view of the improvement.

In the drawings forming part of this specification I have shown at 5 a vessel provided with my improvement and at 6 a sunken reef, and in the practice of my invention I provide a guard for said vessel which is designed to prevent the same from striking said reef or any headland or sunken object when in motion.

My improvement consists of the guard, which is adapted to be secured to the bow of the vessel and which comprises a shaft 7, having an upwardly-directed arm 8 and a rearwardly-directed extension 9, and in practice the rearwardly-directed extension 9 is secured to the keel of the vessel and the arm 8 to the bow thereof in such manner that the shaft 7 projects in front of the vessel.

The connection of the guard with the vessel may be made in any desired manner, and in practice the shaft 7, the arm 8, and the rearwardly-directed extension 9 may all be composed of separate parts, if desired, and be securely connected at the point 10. The shaft 7 may be of any desired length and said guard may be applied or secured to the bow of the vessel and the keel thereof in any desired manner, the only object in this connection being to make the attachment firm and secure, and said guard may also be made of any desired strength, and in practice I prefer to make the same from six to eight inches thick at the point 10, and the shaft 7 will be tapered to the point, as shown in Fig. 2, but, as will be understood, the dimensions would depend upon the tonnage of the vessel.

The operation will be readily understood from the foregoing description when taken in connection with the accompanying drawings.

When a vessel provided with my improved guard is approaching a reef or other obstruction, the guard will strike said reef or obstruction and prevent the vessel coming in contact therewith.

It is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

A guard for vessels, consisting of a shaft which is provided with a rearwardly-directed extension adapted to be secured to the bottom or keel of the vessel and with an upwardly-directed arm which is adapted to be secured to the bow, said shaft being projected forward of the vessel substantially in the plane of the keel extension substantially as shown and described.

In witness whereof I have hereunto set my hand in presence of two witnesses.

WALTER AUGUSTUS FEURTADO.

Witnesses:
 B. L. VERLEY,
 C. HALL.